United States Patent
Yoo et al.

(10) Patent No.: US 7,173,746 B2
(45) Date of Patent: Feb. 6, 2007

(54) MULTI-BEAM SCANNING APPARATUS

(75) Inventors: Jae-hwan Yoo, Yongin (KR);
Hyung-soo Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 134 days.

(21) Appl. No.: 10/639,492

(22) Filed: Aug. 13, 2003

(65) Prior Publication Data
US 2004/0080801 A1    Apr. 29, 2004

(30) Foreign Application Priority Data
Oct. 24, 2002    (KR)    ............ 10-2002-0065068

(51) Int. Cl.
*G02B 26/08*    (2006.01)

(52) U.S. Cl. ............... 359/204; 359/196; 359/205; 359/206

(58) Field of Classification Search ........ 359/204–206, 359/216–219, 738–742; 347/233, 238, 241–244
See application file for complete search history.

(56) References Cited

U.S. PATENT DOCUMENTS 5,831,758 A * 11/1998 Sakai et al. .............. 359/204
RE38,195 E * 7/2003 Sakai et al. .............. 359/204

FOREIGN PATENT DOCUMENTS

JP    10-54950    2/1998

* cited by examiner

*Primary Examiner*—James Phan
(74) *Attorney, Agent, or Firm*—Staas & Halsey LLP

(57) ABSTRACT

A multi-beam scanning apparatus has a lateral magnification M in a sub-scanning direction from a light source to a scanned surface satisfying $8.5 \leq M \leq 9.5$, and a lateral magnification M2 in the sub-scanning direction from a light deflector to the scanned surface satisfying $0.5 \leq M2 \leq 2.0$. The multi-beam scanning apparatus can use a light source having a relatively low power.

18 Claims, 3 Drawing Sheets

MULTI-BEAM SCANNING APPARATUS

CROSS-REFERENCE TO RELATED APPLICATIONS

This application claims the priority of Korean Patent Application No. 2002-65068, filed Oct. 24, 2002, in the Korean Intellectual Property Office, the disclosure of which is incorporated herein by reference.

BACKGROUND OF THE INVENTION

1. Field of the Invention

The present invention relates to a multi-beam scanning apparatus adapted for use in an image forming apparatus such as a printer, a facsimile machine, a copier, etc., and more particularly, to a multi-beam scanning apparatus having a lateral magnification which is capable of enhancing effectiveness of a light source and minimizing a fluctuation in pitch of light on a scanned surface.

2. Description of the Related Art

Generally, a light scanning apparatus of an image forming apparatus such as a printer, a facsimile machine or a copier uses a light source having a plurality of light emitting parts that generate a multi-beam, such as laser beams, in order to form an electrostatic latent image at high speed on a photosensitive body, such as a photosensitive drum or a photosensitive belt.

Such a light scanning apparatus forms the electrostatic latent image on the photosensitive body by the process of: converting the laser beams from the plurality of light emitting parts, such as laser diodes, of the light source into parallel rays of light having predetermined intervals through a collimator lens; leading the laser beams to a light deflector having deflecting reflection surfaces that rotate at high speed; deflecting the direction of the laser beams at the deflecting reflection surfaces; and emitting the laser beams onto the photosensitive body through a scanning lens such as an f-θ lens to form a plurality of scan lines.

Referring to FIG. 1, there is schematically illustrated a conventional multi-beam scanning apparatus forming an electrostatic latent image on a photosensitive body.

The light scanning apparatus includes a light source side optical system 10 having a light source 1 including a plurality of light emitting parts 1a and 1b (FIG. 2) such as laser diodes to emit laser beams, collimator lens 2 arranged to correspond to the light emitting parts 1a and 1b, a slit 8 through which the laser beams which have passed through the collimator lens 2 are converted into a predetermined form, and a cylindrical lens 3 through which the laser beams which have passed through the slit 8 are imaged into elongated linear lights with respect to a main scanning direction A and focused with respect to a sub-scanning direction B. The conventional light scanning apparatus also includes a light deflector 4 having deflecting reflection surfaces 4a supported on a motor (not shown) to be rotated at high speed, to deflect the direction of the laser beams emitted from the cylindrical lens 3; and a scanning optical system 20 including a lens system 5 having first and second f-θ lenses 5a and 5b that compensate for the error included in the laser beams deflected from the light deflector 4, an elongated curvature-of-image-field correcting lens 6 correcting a curvature of image field of the laser beams passed through the first and second f-θ lenses 5a and 5b, and a reflective mirror 9 reflecting the laser beams passed through the curvature-of-image-field correcting lens 6, onto a scanned surface on a photosensitive body such as a photosensitive drum 7.

The operation of the conventional multi-beam scanning apparatus constructed as above will be described below.

The laser beams, which are modulated in accordance with the input image signals, are emitted from the light emitting parts 1a and 1b of the light source 1, and converted into parallel, or collected rays of light by the collimator lens 2.

Then, after passing through the slit 8 that shapes the laser beams in a predetermined form, the laser beams are passed through the cylindrical lens 3, and then deflected by the deflecting reflection surfaces 4a of the light deflector 4, which is rotated at high speed by the motor.

Next, the laser beams are passed through the first and second f-θ lenses 5a and 5b and the curvature-of-image field correcting lens 6, are reflected by the reflective mirror 9, and are then condensed as light spots to scan a plurality of scan lines onto the scanned surface of the photosensitive drum 7 along the main scanning direction.

At this time, the photosensitive drum 7 is driven to rotate in the sub-scanning direction by a driving motor (not shown). Accordingly, as a result of the scanning movements of the light spots in the main scanning direction and the rotation of the photosensitive drum 7 in the sub-scanning direction, a predetermined electrostatic latent image is formed on the photosensitive drum 7.

However, the conventional multi-beam scanning apparatus operated as above generally requires that a composite lateral magnification β in the sub-scanning direction B of the optical systems 10 and 20, i.e., from the light source 1 to the scanned surface, satisfies the condition of $2 \leq \beta \leq 8.5$.

More specifically, the composite lateral magnification β in the sub-scanning direction B is determined by a lateral magnification in the sub-scanning direction B of the light source side optical system 10 including the collimator lens 2 and the cylindrical lens 3 and a lateral magnification in the sub-scanning direction B of the scanning optical system 20 including the first and second f-θ lenses 5a and 5b and the curvature-of-image-field correcting lens 6.

However, if the lateral magnification in the sub-scanning direction B of the scanning optical system 20, i.e., from the light deflector 4 to the scanned surface, is greater than 2, a magnification aberration on the scanned surface is increased, and thereby a performance fluctuation of the light spots is increased. Therefore, usually, the composite lateral magnification β in the sub-scanning direction B mainly depends on an imaging magnification of the collimator lens 2 and an imaging magnification of the cylindrical lens 3.

Accordingly, if the composite lateral magnification β in the sub-scanning direction B is less than 2, a focal length of the collimator lens 2 and a focal length of the cylindrical lens 3 become too small, so that the scanning optical system 20 must be very close to the light deflector 4. As a result, the scanning optical system 20, for example, the curvature-of-image-field correcting lens 6, is disposed close to the scanned surface, thereby becoming easily contaminated by the dispersion of developer.

Also, since the composite lateral magnification β in the sub-scanning direction B corresponds to the ratio of a gap d, i.e., pitch, between the light emitting parts 1a and 1b to a pitch of scan lines, if the composite lateral magnification β in the sub-scanning direction B is greater than 8.5 at an appropriate pitch of the scan lines, the pitch of the light emitting parts 1a and 1b becomes small, thereby generating a thermal cross-torque phenomenon such that the adjacent light emitting parts 1a and 1b have a thermal effect on each other.

Accordingly, the conventional light scanning apparatus is designed so that the composite lateral magnification β in the sub-scanning direction B satisfies the condition of 2≦β≦8.5 to allow the curvature-of-image-field correcting lens 6 to be disposed apart from the scanned surface, thereby preventing the curvature-of-image-field correcting lens 6 from being easily contaminated by dispersion of developer, and to prevent the thermal cross-torque phenomenon. The multi-beam scanning apparatus satisfying such a condition is disclosed in Japanese patent laid-open No. 1998-54950.

On the other hand, as semiconductor manufacturing techniques are rapidly developed, even though the composite lateral magnification β in the sub-scanning direction B is designed to satisfy the condition of 8.5≦β, the thermal cross-torque phenomenon resulting when the pitch of the light emitting parts 1a and 1b is too small does not occur.

However, if a multi-beam scanning apparatus is designed to satisfy the condition of 8.5≦β, a problem may occur in the lateral magnification in the sub-scanning direction B of the light source side optical system 10, i.e., the focal lengths of the collimator lens 2 and the cylindrical lens 3, particularly the focal length of the collimator lens 2, is lengthened.

Thus, when the focal length of the collimator lens 2 is lengthened, the amount of the laser beams, which are actually imaged on the scanned surface through the slit 8 among the laser beams emitted through the collimator lens 2 from the light source 1, is reduced and thus becomes very small. As a result, an output of the light source 1 must be increased, or a light source having a large output must be used, thereby increasing manufacturing costs.

SUMMARY OF THE INVENTION

Accordingly, it is an aspect of the present invention to provide a multi-beam scanning apparatus having a lateral magnification M in a sub-scanning direction from a light source to a scanned surface satisfying the condition of 8.5≦M≦9.5, to improve the effectiveness of the light source.

It is another aspect of the present invention to provide a multi-beam scanning apparatus in which a focal length of a collimator lens of a light source side optical system is reduced to increase a utilization of the light source.

It is yet another aspect of the present invention to provide a multi-beam scanning apparatus having a lateral magnification M2 in a sub-scanning direction from a light deflector to a scanned surface satisfying the condition of 0.5≦M2≦2.0, to minimize a fluctuation in pitch of light on the scanned surface.

Additional aspects and/or advantages of the invention will be set forth in part in the description which follows and, in part, will be obvious from the description, or may be learned by practice of the invention.

The foregoing and/or other aspects of the present invention are achieved by providing a multi-beam scanning apparatus to image a multi-beam on a scanned surface of a photosensitive body including a light source to emit the multi-beam; a light deflector to deflect the multi-beam emitted from the light source; a light source side optical system to guide the multi-beam emitted from the light source to the light deflector; and a scanning optical system to image the multi-beam guided by the light source side optical system on the scanned surface, wherein the light source side optical system and the scanning optical system have a composite lateral magnification M in a sub-scanning direction satisfying 8.5≦M≦9.5.

The scanning optical system has a lateral magnification M2 in the sub-scanning direction satisfying 0.5≦M2≦2.0

The light source side optical system includes a collimator lens to convert the multi-beam emitted from the light source into parallel, or collected rays of light, and a cylindrical lens to image the converted multi-beam into linear shapes; and the collimator lens has a focal length smaller than a focal length of the cylindrical lens. The focal length of the collimator lens is maintained in the range of about 5 mm through 20 mm, particularly, about 8.5 mm.

The light source includes a plurality of light emitting parts, each being including a laser diode having a light emitting point.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
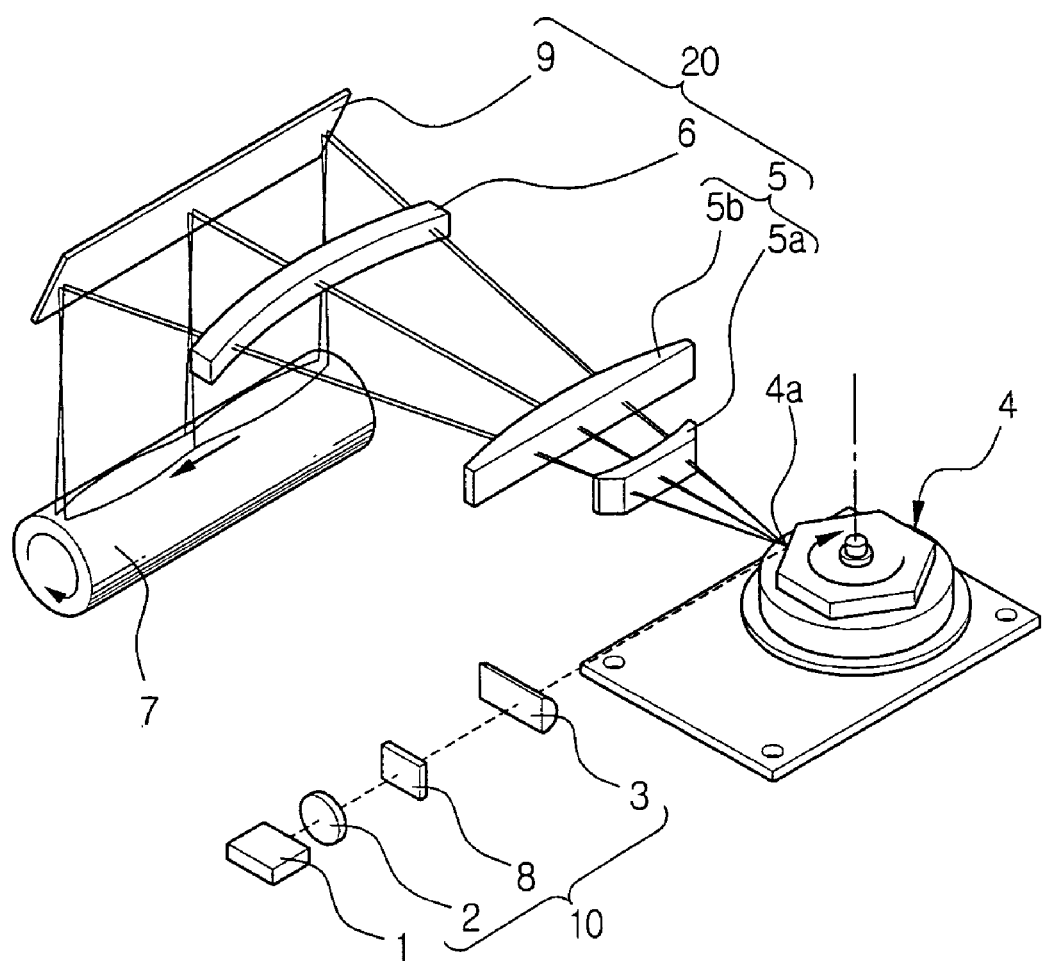
FIG. 1 is a schematic view of a conventional multi-beam scanning apparatus.

Reference will now be made in detail to the present preferred embodiments of the present invention, examples of which are illustrated in the accompanying drawings, wherein like reference numerals refer to like elements throughout.

Figure 3:
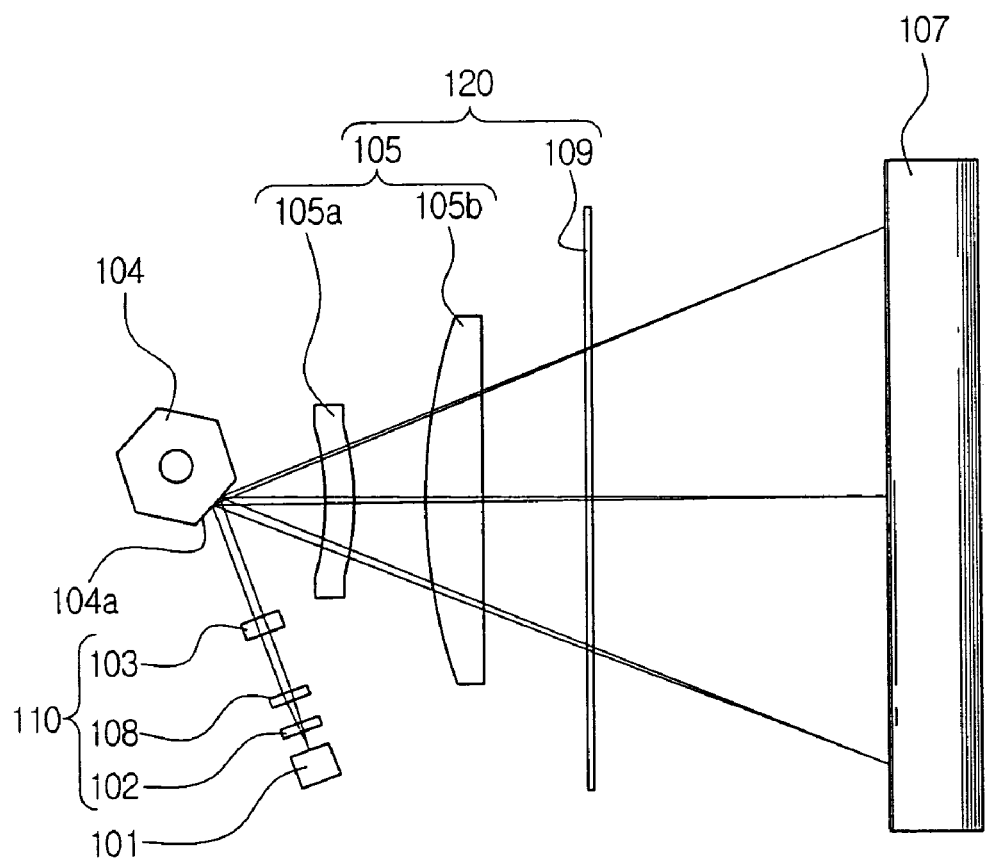
FIG. 3 is a schematic view of a multi-beam scanning apparatus in accordance with an embodiment of the present invention.

Referring to FIG. 3, there is schematically illustrated a multi-beam scanning apparatus in accordance with an embodiment of the present invention.

The multi-beam scanning apparatus includes a light source 101 having a plurality of light emitting parts (not shown) such as laser diodes to emit laser beams, a light deflector 104 to deflect the laser beams emitted from the light source 101, a light source side optical system 110 leading the laser beams emitted from the light source 101 to the light deflector 104, and a scanning optical system 120 imaging the laser beams emitted from the light source side optical system 110 onto a scanned surface of a photosensitive drum 107.

The light emitting parts of the light source 101 are secured in a spaced-apart relation on a same plane of a printed circuit board (not shown) disposed in a case (not shown) to have design margin and circuit composition.

The light deflector 104 is provided with deflecting reflection surfaces 104a that rotate at high speed by a motor.

The light source side optical system 110 includes a collimator lens 102 arranged to correspond to the light emitting parts to form parallel, or collected laser beams, a slit 108 through which the laser beams which have passed through the collimator lens 102 are converted into a predetermined form, and a cylindrical lens 103 through which the laser beams which have passed through the slit 108 are imaged in linear shapes.

The collimator lens 102, which is formed of glass or plastic material, has a spherical or aspherical surface. At this time, the focal length of the lens 102 is maintained in the range of about 5 mm through 20 mm, particularly 8.5 mm. The collimator lens 102 functions to form the laser beams emitted from the light emitting parts of the light source 101 into parallel, or collected rays of light.

The slit 108 blocks peripheral portions of the laser beams which have passed through the collimator lens 102 to convert the peripheral portions into the predetermined form, whereas the cylindrical lens 103 images the laser beams which have passed through the slit 108 into elongated linear shapes with respect to a main scanning direction, and to focus the laser beams with respect to a sub-scanning direction.

The scanning optical system 120 is provided with first and second f-θ lenses 105a and 105b that compensate for the error included in the laser beams deflected by the deflecting reflection surfaces 104a of the light deflector 104, and a reflective mirror 109 to focus the laser beams which have passed through the first and second f-θ lenses 105a and 105b in the sub-scanning direction and to reflect the passed laser beams onto a scanned surface on a photosensitive body such as a photosensitive drum 107.

Figure 4:
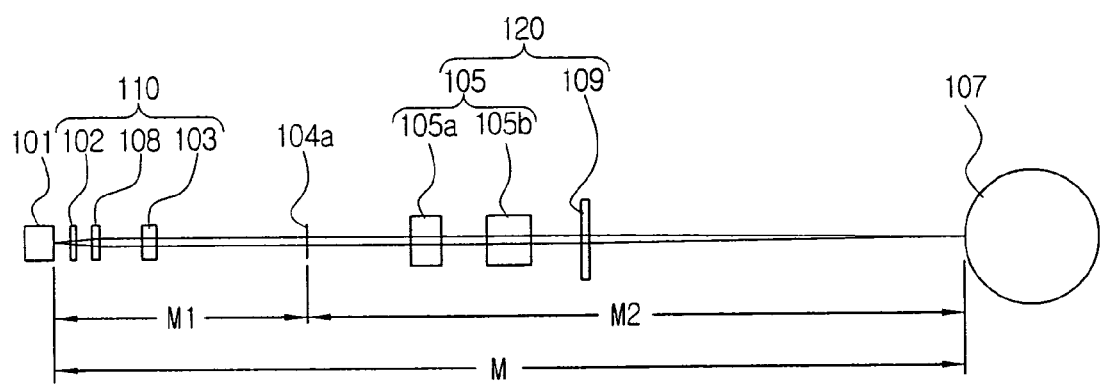
FIG. 4 is a side elevational view illustrating lateral magnifications in the sub-scanning direction of the multi-beam scanning apparatus shown in FIG. 3.

As shown in FIG. 4, the light source side optical system 110 and the scanning optical system 120 are constructed to have a composite lateral magnification M in a sub-scanning direction, i.e., a lateral magnification in the sub-scanning direction from the light source 101 to the scanned surface, satisfying the following mathematical formula:

$$8.5 \leq M \leq 9.5 \quad (1)$$

Also, the scanning optical system 120 has a lateral magnification M2 in a sub-scanning direction, i.e., a lateral magnification in the sub-scanning direction from the light deflector 104 to the scanned surface, satisfying the following mathematical formula:

$$0.5 \leq M2 \leq 2.0 \quad (2)$$

More specifically, the composite lateral magnification M in the sub-scanning direction can be expressed by multiplying a lateral magnification M1 in the sub-scanning direction of the light source side optical system 110 by the lateral magnification M2 in the sub-scanning direction of the scanning optical system 120.

However, since when the lateral magnification M2 in the sub-scanning direction of the scanning optical system 120 is increased above 2, a magnification aberration on the scanned surface is increased and thereby a performance fluctuation of the light spots is increased, the lateral magnification M2 in the sub-scanning direction of the scanning optical system 120 is set to satisfy formula (2).

Accordingly, the composite lateral magnification M in the sub-scanning direction almost entirely depends on the lateral magnification M1 in the sub-scanning direction of the light source side optical system 110.

In the conventional apparatus of FIG. 1, lateral magnification M1 in the sub-scanning direction of the light source side optical system 110, as described with reference to the conventional light scanning apparatus, actually depends on a focal length Fc of the collimator lens 102 and a focal length Fy of the cylindrical lens 103.

Accordingly, if the composite lateral magnification M in the sub-scanning direction is enlarged, for example, to satisfy the condition of $8.5 \leq M$, the focal lengths of the collimator lens 102 and the cylindrical lens 103 of the light source side optical system 110 are lengthened. Particularly, the focal length of the collimator lens 102 is lengthened. As a result, the amount of laser beams which are actually imaged on the scanned surface through the slit 108, from among the laser beams emitted through the collimator lens 102 from the light source 101, becomes very small, and thereby a problem occurs because the output of the light source 101 must be increased, or a light source having a large output must be used.

To solve these and/or other problems, the multi-beam scanning apparatus of the embodiment of the present invention is constructed so that the focal length Fc of the collimator lens 102 of the light source side optical system 110 is relatively reduced as compared with the focal length Fy of the cylindrical lens 103. As a result, even though light emitting parts having relatively low output are used, a sufficient amount of laser beams can be actually imaged as light spots on the scanned surface through the slit 108. At this time, the focal length Fc of the collimator lens 102 is maintained in the range of about 5 mm through 20 mm, particularly 8.5 mm.

However, if the composite lateral magnification M in the sub-scanning direction determined as above deviates from formula (1) ($8.5 \leq M \leq 9.5$), the laser beams are insufficiently imaged as light spots on the scanned surface through the slit 108.

Accordingly, the composite lateral magnification M in the sub-scanning direction is determined to satisfy the condition of $8.5 \leq M \leq 9.5$.

Figure 2:
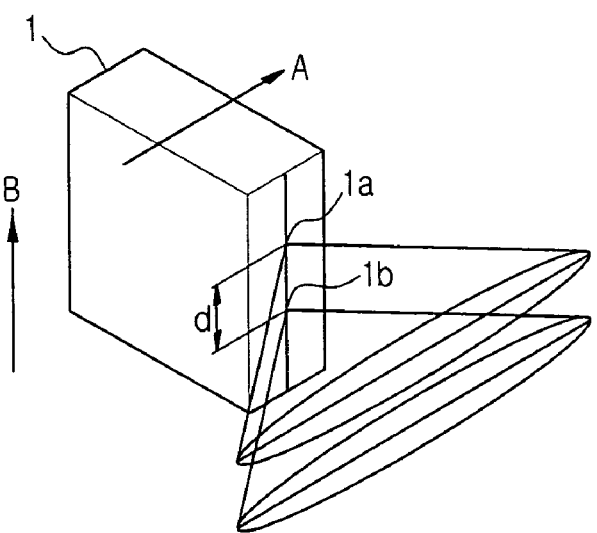
FIG. 2 is a detailed view of a light source of the multi-beam scanning apparatus shown in FIG. 1.

A description of the operation of the above-described light scanning apparatus will be omitted hereinafter, as it is similar to that of the conventional light scanning apparatus of FIGS. 1 and 2.

As shown in a table 1 below, when a composite lateral magnification M in the sub-scanning direction, a lateral magnification M1 in the sub-scanning direction of the light source side optical system 110, a lateral magnification M2 in the sub-scanning direction of the scanning optical system 120, and a focal length of the collimator lens Fc were constructed as 9, 9, 1, and 8.5 mm, respectively, a transmittance T at the slit 108 that expresses a utilization of output of the light source 101 was 34%. This transmittance (34%) was a result superior to a transmittance (11%) of a comparative example obtained by the conventional multi-beam scanning apparatus explained with reference to FIG. 1.

TABLE 1

|  | M1 | M2 | M | Fc | T |
|---|---|---|---|---|---|
| Present Embodiment | 9.0 | 1.0 | 9.0 | 8.5 mm | 34% |
| Comparative example | 3.0 | 1.0 | 3.0 | 23.5 mm | 11% |

As is apparent from the foregoing description, it can be appreciated that the multi-beam scanning apparatus of the embodiment of the present invention can use a light source having a relatively low power, thereby reducing manufacturing costs, by having the lateral magnification M in the sub-scanning direction from the light source to the scanned surface satisfying the condition of $8.5 \leq M 9.5$.

Also, the multi-beam scanning apparatus of the embodiment of the present invention can enhance the usefulness of the light source by decreasing the focal length of the collimator lens among elements of the light source side optical system 110.

Also, the multi-beam scanning apparatus of the embodiment of the present invention can minimize a fluctuation in the pitch of light on the scanned surface, by having the lateral magnification M2 in the sub-scanning direction from the light deflector to the scanned surface satisfying the condition of $0.5 \leq M \leq 2.0$.

Although an embodiment of the present invention has been shown and described, it will be appreciated by those skilled in the art that changes may be made in this embodiment without departing from the principles and spirit of the invention, the scope of which is defined in the claims and their equivalents.

What is claimed is:

1. A multi-beam scanning apparatus to image a multi-beam on a scanned surface of a photosensitive body comprising:
    a light source to emit the multi-beam;
    a light deflector to deflect the multi-beam emitted from the light source;
    a light source side optical system to guide the multi-beam emitted from the light source to the light deflector; and
    a scanning optical system to image the multi-beam guided by the light source side optical system on the scanned surface,
    wherein the light source side optical system and the scanning optical system have a composite lateral magnification M in a sub-scanning direction satisfying $8.5 < M \leq 9.5$.

2. A multi-beam scanning apparatus to image a multi-beam on a scanned surface of a photosensitive body comprising:
    a light source to emit the multi-beam;
    a light deflector to deflect the multi-beam emitted from the light source;
    a light source side optical system to guide the multi-beam emitted from the light source to the light deflector; and
    a scanning optical system to image the multi-beam guided by the light source side optical system on the scanned surface,
    wherein the light source side optical system and the scanning optical system have a composite lateral magnification M in a sub-scanning direction satisfying $8.5 \leq M \leq 9.5$, wherein the scanning optical system has a lateral magnification M2 in the sub-scanning direction satisfying $0.5 \leq M2 \leq 2.0$.

3. The apparatus of claim 2, wherein the light source side optical system comprises:
    a collimator lens to convert the multi-beam emitted from the light source into parallel, or collected rays of light, and
    a cylindrical lens to image the converted multi-beam into linear shapes; and
    the collimator lens has a focal length smaller than a focal length of the cylindrical lens.

4. The apparatus of claim 3, wherein the focal length of the collimator lens is between 5 mm and 20 mm.

5. The apparatus of claim 4, wherein the focal length of the collimator lens is about 8.5 mm.

6. The apparatus of claim 1, wherein the light source comprises a plurality of light emitting parts, each comprising a laser diode having a light emitting point.

7. An apparatus comprising:
    a light source to emit light;
    a first optical system to guide the emitted light; and
    a second optical system to receive the guided light from the first optical system to generate an image,
    wherein the first optical system and the second optical system have a composite lateral magnification M in a sub-scanning direction satisfying $8.5 \leq M \leq 9.5$.

8. The apparatus of claim 7, further comprising a light deflector to receive the guided light from the first optical system and deflect the received light to the second optical system.

9. The apparatus of claim 7, wherein the light source comprises a plurality of light emitting parts in a spaced-apart relation on a same plane.

10. The apparatus of claim 8, wherein the light deflector comprises a plurality of deflecting reflection surfaces that rotate.

11. The apparatus of claim 7, wherein the first optical system comprises a collimator lens having a spherical or aspherical surface.

12. The apparatus of claim 11, wherein the collimator lens has a focal length between 5 mm and 20 mm.

13. The apparatus of claim 8, further comprising a scanned surface to receive the generated image.

14. The apparatus of claim 7, wherein the second optical system comprises a plurality of f-θ lenses.

15. The apparatus of claim 11, wherein the first optical system comprises a slit to receive the emitted light from the collimator lens.

16. The apparatus of claim 15, wherein a transmittance at the slit is greater than 11%.

17. The apparatus of claim 16, wherein a transmittance at the slit is approximately 34%.

18. An apparatus comprising:
    a light source to emit light;
    a first optical system to guide the emitted light; and
    a second optical system to receive the guided light from the first optical system to generate an image,
    wherein the first optical system and the second optical system have a composite lateral magnification M in a sub-scanning direction satisfying $8.5 \leq M \leq 9.5$, and the apparatus has a lateral magnification M2 in the sub-scanning direction satisfying $0.5 \leq M2 \leq 2.0$.

* * * * *